United States Patent Office 3,567,680
Patented Mar. 2, 1971

3,567,680
SURFACE MODIFIED PIGMENTS AND METHODS FOR PRODUCING SAME AND ELASTOMERS CONTAINING SAME
Joseph Iannicelli, Macon, Ga., assignor to
J. M. Huber Corporation, Locust, N.J.
No Drawing. Filed May 3, 1968, Ser. No. 726,585
Int. Cl. C08c *11/14;* C08h *17/02*
U.S. Cl. 260—41.5                                            5 Claims

ABSTRACT OF THE DISCLOSURE

A mercaptosilane grafted inorganic pigment such as kaolin clay for use as a reinforcing filler in elastomers, plastics, and the like is obtained by spray drying a dispersed aqueous slurry of the pigment in the presence of a small amount of mercaptoorganosilane. Small amounts of mercaptosilane grafted to inorganic pigments such as kaolin clay significantly increase the reinforcement of elastomers. A blend of mercaptosilane and aminosilane grafted to inorganic pigments such as kaolin clay gives higher reinforcement to elastomers than like amounts of either mercaptosilanes or aminosilanes grafted to the pigment alone.

BACKGROUND OF THE INVENTION

In general, the present invention relates to inorganic pigments and more especially to modifications of inorganic pigments such as kaolin clays.

In particular, the present invention relates to the modification of finely divided particulate inorganic pigments such as kaolin clays by their treatment with mercaptoorganosilanes and with blends of mercaptosilanes and aminosilanes. In addition, the present invention relates to the process for the production of treated inorganic pigments such as kaolin clays as described herein.

The term "inorganic pigments" as used herein in referring to these pigments which may be advantageously modified in the practice of this invention includes, for example, the following typical finely divided particulate inorganic pigments: inorganic compounds of silicon, including hydrated or anhydrous silicas, calcium silicates, calcium-magnesium silicates, barium silicates, sodium-alumino-silicates, calcium-alumino-silicates, calcium-sodium-alumino silicates; clays (aluminum silicates) such as kaolins which include dickite, kaolinite and nacrite, halloysite, montmorillonites including sodium and magnesium bentonites; synthetic or natural zeolites; synthetic or natural talcs (magnesium silicates); various metal oxides and carbonates such as zinc oxide, alumina, titania or magnesia, calcium carbonate; titanium dioxide; ferric oxide. In addition, zinc sulfide, barium sulfate, carbon blacks and the like are also useful in the practice of this invention.

All of the above filler pigments are available on a commercial scale and include the following finely divided, particulate substances:

Zeolex®, very finely divided precipitated sodium aluminosilicate pigments of submicron particle size and disclosed in U.S. Pats. 2,739,073 and 2,848,346.

Zeosil®, very finely divided precipitated hydrated silica of submicron particle size and disclosed in copending U.S. patent applications Ser. No. 144,168 filed Oct. 10, 1961, now Pat. No. 3,328,124, and 149,964 filed Nov. 3, 1961, now Pat. No. 3,328,125.

Suprex®, an air floated kaolin clay with platelike particles of which 87–92% are minus 2 microns.

Aromex®, intermediate super abrasion furnace carbon blacks.

Essex®, semi-reinforcing furnace blacks.

Silene EF®, a precipitated hydrated calcium silicate of very fine particle size.

Hi-Sil®, a precipitated hydrated silica of very fine particle size.

Celite®, a diatomaceous earth which is principally a hydrated silica.

Alumina C®, a hydrated aluminum oxide of small particle size.

Kadox®, a zinc oxide filler.

Titanox®, a pigment grade commercial titanium dioxide.

Cab-O-Sil®, a very finely divided anhydrous silica.

Ludox®, a precipitated silica of very fine particle size.

When inorganic pigments are modified with mercaptosilane and mercaptosilane-aminosilane blends according to this invention, the properties imparted to them are such that they can advantageously be used as fillers for thermosetting resins such as polyurethanes, epoxy polymers, melamine polymers, phenolic polymers, ureaformaldehyde polymers, unsaturated polyesters, as well as other polymers and elastomers including polyethylenes, polypropylenes, polystyrenes, saturated polyesters, polyamides, polyvinyl compounds, polyisoprenes, polybutadienes, polystyrenebutadienes, and the like.

The modified pigments can also be advantageously used as fillers for paper, paints, varnishes, inks, and paper coating compositions.

By the use of these modified finely divided particulate inorganic pigments, improved physical properties are imparted to the vehicles in which they are incorporated.

Kaolin clays are used as fillers in rubber because of their reinforcing and stiffening properties and because they can be introduced at high loadings, thereby substantially lowering the cost of rubber compounds. While the mode of interaction between kaolin and rubber has not been fully elucidated, the effect is believed to be due more to physical adsorption of polymer on the high surface area clay than to chemical linkages between clay and rubber. As a result, clay filled rubber stocks have not achieved the performance levels attainable with the use of highly reinforcing fillers such as carbon black.

In many applications it is desired to produce non-black rubber stocks having substantially higher physical properties than can be achieved with clay fillers. This is particularly true in the case of some of the newer synthetic rubbers such as ethylene propylene terpolymers (EPT, EPDM) which, despite many desirable properties, tend to give lower modulus vulcanizates than natural rubber or SBR rubber.

Attempts have been made to improve the reinforcing performance of kaolin clays in rubber by use of silane coupling agents in the rubber compounds. However, such efforts have suffered from the disadvantage that a portion of the expensive silane coupling agent is wasted by reaction with or escaping into the mixing equipment. In addition, some of the silanes are hydrolyzed by moist air or are lost by volatilization during mixing. Since most silanes are corrosive and irritating, this procedure also creates the possibility of health hazards. In the case of odorous compounds such as mercaptosilanes, it would not be practical to permit use of these chemicals in the usual factory mixing areas.

Efforts to pretreat mercaptosilanes on clay by the usual blending techniques produce poor results and also lead to serious odor problems in handling of the clay and during mixing cycles.

Accordingly, it is an object of the present invention to provide a new, highly effective modified inorganic pigment such as kaolin clay and method for producing the same which overcomes the deficiencies of the prior art attempts as described above.

It is a further object of the present invention to provide a highly reinforcing modified inorganic pigment.

Another object of the present invention is to provide a method for producing a highly reinforcing modified inorganic pigment.

An additional object of the present invention is to provide a uniformly modified inorganic pigment such as kaolin clay providing high reinforcement of elastomers, plastics, and the like at very low levels of grafted silane.

Another object is to provide an odor free mercaptosilane modified clay which does not generate offensive odors during mixing in elastomers, plastics, and the like.

Yet another object is to provide an economically favorable process for the production of highly reinforcing modified inorganic pigments such as kaolin clays.

Other objects and a fuller understanding of the invention may be had by referring to the following description and claims taken in conjunction with one another.

BRIEF SUMMARY OF THE INVENTION

The present invention overcomes the deficiencies of the prior art approaches and achieves its objectives by the introduction of minor amounts of mercaptosilanes in inorganic pigment slurries, such as kaolin clay slurries, prior to spray drying to furnish a uniformly modified, odor free inorganic pigment having greatly increased reinforcement properties in elastomers, plastics, and the like. In addition, it has been discovered that mercaptosilanes coapplied with aminosilanes to inorganic pigments such as kaolin clays have the synergistic effect of producing superior properties to those pigments grafted with equivalent amounts of mercaptosilane or aminosilanes individually.

DESCRIPTION OF THE PREFERRED EMBODIMENTS

In order to facilitate the understanding of the present invention, reference will now be made to certain preferred embodiments of the present invention. These embodiments should not be construed as limiting the invention but are exemplary only.

The modified pigments of this invention can be prepared by dissolving the desired amount of mercaptosilane and/or mercaptosilane-aminosilane blends in a suitable solvent, adding the pigment and heating until the reaction is complete. The amount of modifier added depends upon the particular pigment being modified and the use for which it is intended. Generally up to about 3% by weight of the modifier is sufficient for most purposes.

A particularly useful process of modifying pigments according to this invention involves spray drying pigment slurries having the mercaptosilane and/or mercaptosilane-aminosilane blends dispersed therein. The spray drying process effects a uniform distribution of the modifier on the pigment and virtually instantaneously cures the modifier on the pigment.

For example, it has been discovered that introduction of minor amounts of mercaptosilanes in kaolin slurries prior to spray drying furnishes uniformly modified odor free kaolin having greatly increased reinforcement in elastomers and plastics.

Use of 0.1 to 3.0% mercaptosilane (preferably 0.3 to 1.0%) based on weight of clay furnishes the desired improvements in reinforcement. In a typical procedure, a dispersed kaolin slurry is treated with gamma-mercaptopropyltrimethoxysilane. The slurry is agitated and spray dried.

The compounds used to modify kaolin can be depicted by the formula

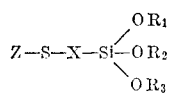

wherein

Z is hydrogen, a cation, alkyl, aryl, alkylaryl, arylalkyl, acyl, or derivatives thereof X is alkyl, alkylaryl, or arylalkyl and $R_1$, $R_2$, $R_3$ are hydrogen, cations, or alkyl.

Mercaptosilanes may be advantageously coapplied with aminosilanes by this technique to furnish grafted clays having superior properties to inorganic pigments, such as kaolin clays, grafted with equivalent amounts of mercaptosilane or aminosilanes individually.

Kaolin clays used to prepare grafted products of the invention consist of relatively pure aluminum silicate, including Suprex—an air floated kaolin clay with platelike particles of which 87–92% are below 2 microns, E.S.D.

Hydragloss—a water washed kaolin with platelike particles of which 92–94% are below 2 microns, E.S.D.

Hydrafine—a water washed kaolin with plate like particles of which 90–92% are below 2 microns, E.S.D.

CWF—a coarse fraction water washed kaolin having a particle size of about 30% minus 2 microns.

Where mercaptosilane-aminosilane blends are employed the aminosilane compounds used to modify the pigments can be depicted by the formula:

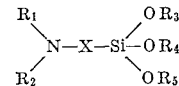

wherein $R_1$ is hydrogen, alkyl, aryl, cycloalkyl, or alkylaryl; $R_2$ is hydrogen, alkyl, aryl, cycloalkyl or alkylaryl; $R_3$ is hydrogen, lower alkyl, aryl, lower alkylaryl, or lower arylalkyl; $R_4$ is hydrogen, lower alkyl, aryl, lower alkylaryl or lower arylalkyl; $R_5$ is hydrogen, lower alkyl, aryl, lower alkylaryl or lower arylalkyl; and X is alkylene, arylene, alkylarylene, arlalkylene, cycloalkylene having secondary and/or tertiary nitrogen present in the chain, and/or primary secondary, and/or tertiary nitrogen pendant from the chain. Some of these amino organosilanes are disclosed along with methods for their preparation in U.S. Pat. Nos. 2,832,754; 2,930,809; 3,007,-957; and 3,020,302. Commercially available aminoorganosilanes include "A-1100" (gamma aminopropyltriethoxysilane) sold by Union Carbide Corporation, New York, N.Y., and "Z-6020" (a diamino functional silane) sold by Dow Corning Corporation, Midland, Mich., or "A-1120" (a diamino functional silane) sold by Union Carbide Corporation.

The following examples illustrate typical methods by which various pigments are surface modified in accordance with the present invention. All percentages of the silanes are based on the weight of the dry pigment.

EXAMPLE 1

Ten pounds of Suprex clay is treated with .05 pound (0.5%) gamma-mercaptopropyltrimethoxysilane and blended in a Twin Shell Blendor for 30 minutes. At the end of this period the clay is dried under infrared lamps for 30 minutes and hammermilled.

EXAMPLE 2

Example 1 is repeated using 0.6% mercaptosilane.

EXAMPLE 3

Example 1 is repeated using 0.7% mercaptosilane.

EXAMPLE 4

A slurry of Suprex containing 20% solids is treated with 0.5% gamma-mercaptopropyltrimethoxysilane and stirred for 30 minutes. The slurry is spray dried at an inlet temperature of 600° F. and an outlet temperature of 230° F.

EXAMPLE 5

The procedure of Example 4 is repeated using 0.35% gamma-mercaptopropyltrimethoxysilane.

EXAMPLE 6

The procedure of Example 4 is repeated using 1.0% gamma-mercaptopropyltrimethoxysilane.

EXAMPLE 7

The procedure of Example 4 is repeated using the S-thiouronium salt derived from thiourea and gamma chloropropyltrimethoxysilane with an inlet temperature of 800° F. for the spray drying process.

EXAMPLE 8

The procedure of Example 7 is repeated using 0.35% S-thiouronium salt derived from thiourea and gamma-chloropropyltrimethoxysilane.

EXAMPLE 9

The procedure of Example 8 is repeated using 1% S-thiouronium salt derived from thiourea and gamma-chloropropyltrimethoxysilane.

EXAMPLE 10

A dispersed slurry of unbleached Hydragloss containing 44% solids is treated with 0.35% gamma-mercaptopropyltrimethoxysilane and agitated for 30 minutes after which it is spray dried at an inlet temperature of 600° F. and an outlet temperature of 220° F.

EXAMPLE 11

The procedure of Example 10 is repeated using 0.5% gamma-mercaptopropyltrimethoxysilane.

EXAMPLE 12

The procedure of Example 11 is repeated using 1.0% gamma-mercaptopropyltrimethoxysilane.

EXAMPLE 13

The procedure of Example 11 is repeated using 3.0% gamma-mercaptopropyltrimethoxysilane.

EXAMPLE 14

A slurry of predispersed bleached Hydragloss is treated with 0.35% gamma-mercaptopropyltrimethoxysilane, agitated for 30 minutes and then spray dried at an inlet temperature of 600° F. and an outlet temperature of 230° F.

EXAMPLE 15

The procedure of Example 14 is repeated using 0.50% gamma-mercaptopropyltrimethoxysilane.

EXAMPLE 16

The procedure of Example 14 is repeated using 1.0% gamma-mercaptopropyltrimethoxysilane.

EXAMPLE 17

As a control for the following samples, a slurry of unbleached Hydragloss is treated with 1% (β-aminoethyl) gamma-aminopropyltrimethoxysilane and spray dried at an inlet temperature of 600° F. and an outlet temperature of 230° F.

EXAMPLE 18

The procedure of Example 17 is repeated using 0.5% aminosilane.

EXAMPLE 19

The procedure of Example 17 is repeated using 0.40% gamma-mercaptopropyltrimethoxysilane and 0.10% (β-aminoethyl) gamma-aminopropyltrimethoxysilane.

EXAMPLE 20

The procedure of Example 17 is repeated using 0.35% mercaptosilane and 0.15% aminosilane.

EXAMPLE 21

The procedure of Example 17 is repeated using 0.30% mercaptosilane and 0.20% aminosilane.

EXAMPLE 22

The procedure of Example 17 is repeated using 0.25% mercaptosilane and 0.25% aminosilane.

EXAMPLE 23

The procedure of Example 17 is repeated using 0.20% mercaptosilane and 0.30% aminosilane.

EXAMPLE 24

The procedure of Example 17 is repeated using 0.10% mercaptosilane and 0.50% aminosilane.

EXAMPLE 25

A 35% slurry of CWF (coarse washed filler) having a particle size of 30–35% minus 2 microns is treated with 3.0% mercaptosilane and spray dried at an inlet temperature of 600° F. and an outlet temperature of 230° F.

EXAMPLE 26

A 17.5% slurry of Mistron vapor, a finely divided talc having a mean particle size of 1 micron is treated with 0.25% mercaptopropylsilane and spray dried.

EXAMPLE 27

The procedure of Example 26 is repeated using 0.50% mercaptopropylsilane.

EXAMPLE 28

The procedure of Example 26 is repeated using 1% mercaptopropylsilane.

EXAMPLE 29

A 45% slurry of Du Pont TiPure PC, a finely divided pigmentary titanium dioxide, anatase grade, is treated with 1% mercaptopropylsilane and spray dried.

EXAMPLE 30

A precipitated calcium carbonate (Purecal O) slurry containing 28% solids is treated with 0.5% mercaptopropylsilane and spray dried.

EXAMPLE 31

A 20% slurry of finely divided precipitated sodium aluminosilicate pigment having a submicron particle size is treated with 0.5% mercaptopropylsilane and spray dried.

EXAMPLE 32

A 20% slurry of precipitated hydrated silica of fine particle size is treated with 0.2% mercaptopropylsilane and spray dried.

EXAMPLE 33

A 31% slurry of finely divided precipitated sodium aluminosilicate pigment having a submicron particle size is treated with 0.1% mercaptopropylsilane plus 0.1% β-aminoethyl gamma-aminopropyltrimethoxysilane and spray dried.

EXAMPLE 34

A 31% slurry of Hi-Sil is treated with 0.2% mercaptopropyltrimethoxysilane and 0.1% gamma-aminopropyltriethoxysilane and spray dried.

Table I shows the superior reinforcement imparted by mercaptosilane modified clays prepared by the spray drying technique compared with those prepared by the dry blending technique.

TABLE I

|  | Percent mercapto-silane | Method prepared [1] | Modulus, p.s.i. in Natsyn 400 [2] at 300% elongation, 20 min. cure |
|---|---|---|---|
| Example: | | | |
| 10 | 0.35 | SD | 1,740 |
| 11 | 0.5 | SD | 1,930 |
| 1 | 0.5 | DB | 1,600 |
| 2 | 0.6 | DB | 1,620 |
| 3 | 0.7 | DB | 1,760 |

[1] SD=spray dried modification; DB=blend of mercaptosilane on dry clay.
[2] The recipe consisted of—

| Ingredients: | | X5 | Final mix | |
|---|---|---|---|---|
| Natsyn 400 | 100.0 | 500.0 | | |
| Zinc oxide | 5.0 | 25.0 | | |
| Stearic acid | 2.0 | 10.0 | MB | 915.0 |
| Clay | 75.0 | 375.0 | Sulfur | 13.75 |
| Sulfur | 2.75 | | $A_{max}$ | 6.25 |
| Agerite white | 1.0 | 5.0 | Methyl tuads | 1.0 |
| $A_{max}$ | 1.25 | | | |
| Methyl tuads | 0.2 | | | |
| Total | 187.20 | 915.0 | | 936.0 |

From the above, it is apparent that the spray dried modification of this invention gives better reinforcement than the dry blend modification—even when the dry blend contains 40% more mercaptosilane than the spray dried modification. In addition, the spray dried modifications were odorless as prepared and during mixing in rubber, whereas the dry blend modifications emitted mercapto odors in the dry state and during mixing.

The mixing method for the above is as follows:

Minutes:                                    Ingredients
0 _____ Band rubber
2 _____ Stearic acid
4 _____ Clay, zinc, agerite
Add accelerator and sulfur on cold mill.
10 _____ Cut 6 times
13 _____ Remove, cool 1 hour Table II shows the superiority of mixtures of mercaptosilane with aminosilanes compared with equivalent amounts of either silane individually.

TABLE II

| | Percent mercapto-silane | Percent amino-silane | 300% modulus in Natsyn 400, 20 min. cure(3) | 300% modulus in Royalene 301T, 40 min. cure(4) |
|---|---|---|---|---|
| Example: | | | | |
| 11 | 0.50 | 0 | 1,860 | 400 |
| 17 | 0 | 1.0 | 1,870 | 400 |
| 18 | 0 | 0.50 | 1,370 | |
| 20 | 0.35 | 0.15 | 1,930 | 360 |
| 21 | 0.30 | 0.20 | 2,000 | 410 |
| 22 | 0.25 | 0.25 | 1,940 | 430 |
| 23 | 0.20 | 0.30 | 1,910 | 400 |

Use of mercaptosilane in combination with aminosilane in which the mercaptosilane component represents between 30 to 70% of the total silane applied furnishes a strong synergistic effect, compared with use of 100% mercaptosilane.

Recipes and mixing procedures for the vulcanizates shown in Table II are given below:

RECIPES FOR (3)

| Ingredients: | | X5 | | Final mix |
|---|---|---|---|---|
| Natsyn 400 | 100.0 | 500.0 | | |
| Zinc oxide | 5.0 | 25.0 | | |
| Stearic acid | 2.0 | 10.0 | MB | 915.0 |
| Clay | 75.0 | 375.0 | Sulfur | 13.75 |
| Sulfur | 2.75 | | $A_{max}$ | 6.25 |
| Agerite white | 1.0 | 5.0 | Methyl tuads | 1.0 |
| $A_{max}$ | 1.25 | | | |
| Methyl tuads | 0.2 | | | |
| Total | 187.20 | 915.0 | | 936.0 |

Mixing method for (3).

Minutes:                                    Ingredients
0 _____ Band rubber
2 _____ Stearic acid
4 _____ Clay, zinc, agerite
And accelerator and sulfur on cold mill.
10 _____ Cut 6 times
13 _____ Remove, cool 1 hour

RECIPES FOR (4)

| Ingredients: | | | Final mix batch X6 |
|---|---|---|---|
| Smoked sheets | 80.0 | | |
| Royalene 301T | 20.0 | Masterbatch C-5857 | 872.0 |
| Titanium dioxide | 5.0 | Clay | 120.0 |
| Zinc oxide | 5.0 | Sulfur | 15.0 |
| Calcene TM | 20.0 | | |
| Clay, as noted | 20.0 | | |
| Stearic acid | 2.0 | | |
| Circo light oil | 5.0 | | |
| Sunproof improved | 5.0 | | |
| MBTS | .45 | | |
| Methyl tuads | .15 | | |
| Sulfur | 2.5 | | |
| Red D-2604 | 2.7 | | |
| Total | | | 1,007.0 |

Mixing method for (4):

6 x 12 mill _____ 120° F.
0 _____ Band masterbatch
1 _____ Add clay and sulfur
5 _____ Sheet off While specific temperatures and times have been given in many of the examples for the slurry and spray drying operations these parameters may be varied depending on the nature of the materials involved. However, a practical limit on the inlet temperature of 800° F. has been found with a preferred inlet temperature of 600° F., since an appreciable loss of reinforcement properties takes place above 800° F.

While kaolin clay has been predominately referred to in the above discussion as the preferred embodiment of the pigment, any of the other suitable inorganic pigments such as the typical "inorganic pigments" set forth above in the background of the present invention may be modified in a like manner and employed to like effect as illustrated by the last nine examples of the present case.

While the invention has been described herein with reference to its preferred embodiments, it will be understood by those skilled in the art that various changes in procedure may be made and equivalents may be substituted for the elements thereof without departing from the true spirit and scope of the invention. In addition, many modifications may be made to adapt to a particular situation or a material to the teaching of the invention without departing from its essential teachings. Therefore, although specific preferred embodiments of the present invention have been described in detail above, the description is not intended to limit the invention to the particular forms or embodiments disclosed herein, since they are to be recognized as illustrative rather than restrictive and it will be obvious to those skilled in the art that the invention is not so limited. The invention is declared to cover all changes and modifications of the specific examples of the invention herein disclosed for purposes of illustration, which do not constitute departures from the spirit and scope of the invention.

What is claimed is:

1. A finely divided particulate inorganic pigment surface modified with a blend of from 0.1 to 3.0%, based on the weight of the dry pigment, of a mercaptoorganosilane and an aminoorganosilane, wherein said blend contains 30 to 70% of said mercaptoorganosilane, based on the total silane present, and wherein said mercaptoorganosilane is of the formula:

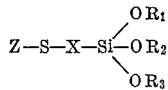

wherein Z is selected from the group consisting of hydrogen, cation, alkyl, aryl, allkylaryl, arylalkyl, acyl and derivatives thereof; X is selected from the group consisting of alkyl, alkylaryl, and arylalkyl; and $R_1$, $R_2$, and $R_3$ are respectively selected from the group consisting of hydrogen, cation, and alkyl; and wherein said aminoorganosilane is of the formula:

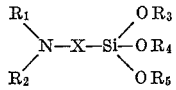

wherein $R_1$ is selected from the group consisting of hydrogen, alkyl, aryl, cycloalkyl, or alkylaryl; $R_2$ is selected from the group consisting of hydrogen, alkyl, aryl, cycloalkyl, or alkylaryl; $R_3$ is selected from the group consisting of hydrogen, lower alkyl, aryl, lower alkylaryl, or lower arylalkyl; $R_4$ is selected from the group consisting of hydrogen, lower alkyl, aryl, lower alkylaryl, or lower arylalkyl; $R_5$ is selected from the group consisting of hydrogen, lower alkyl, aryl, lower alkylaryl, or lower arylalkyl; and X is selected from the group consisting of alkylene, arylene, alkylarlene, arylalkylene, or cycloalkylene having secondary and/or tertiary nitrogen present in the chain, and/or piramary, secondary, and/or tertiary nitrogen pendant from the chain.

2. The process for preparing a finely divided particulate inorganic pigment surface modified with a blend of mercaptoorganosilane and aminoorganosilane comprising: preparing a slurry of said inorganic pigment; adding to said slurry a blend containing 30 to 70% of a mercaptoorganosilane, based on the total silane to be applied, and from 0.1 to 3.0% mercaptoorganosilane, based on the weight of the dry pigment, where said aminoorganosilane is of the formula:

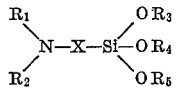

where $R_1$ is selected from the group consisting of hydrogen, alkyl, aryl, cycloalkyl, or alkylaryl; $R_2$ is selected from the group consisting of hydrogen, alkyl, aryl, cycloalkyl, or alkylaryl; $R_3$ is selected from the group consisting of hydrogen, lower alkyl, aryl, lower alkyaryl, or lower arylalkyl; $R_4$ is selected from the group consisting of hydrogen, lower alkyl, aryl, lower alkylaryl, or lower arylalkyl; $R_5$ is selected from the group consisting of hydrogen, lower alkyl, aryl, lower alkylaryl, or lower arylalkyl; and X is selected from the group consisting of alkylene, arylene, alkylarlene, arylalkylene, or cycloalkylene having secondanry and/or tertiary nitrogen present in the chain, and/or primary, secondary, and/or tertiary nitrogen pendant from the chain and where said mercaptoorganosilane is of the formula:

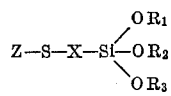

where Z is selected from the group consisting of hydrogen, cation, alkyl, aryl, alkylaryl, arylalkyl, acyl, and derivatives thereof; X is selected from the group consisting of alkyl, alkylaryl, and arylalkyl; and $R_1$, $R_2$, and $R_3$ are respectively selected from the group consisting of hydrogen, cation, and alkyl; and spray drying said slurry containing said blend to produce said surface modified pigment.

3. A finely divided particulate inorganic reinforcing filler pigment for elastomers consisting essentially of kaolin clay surface modified with from 0.1 to 3.0% based on the weight of the dry pigment, of a mercaptoorganosilane of the formula:

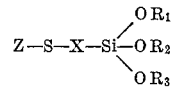

wherein Z is selected from the group consisting of hydrogen, cation, alkyl, aryl, alkylaryl, arylalkyl, acyl, and derivatives thereof; X is selected from the group consisting of alkyl, alkylaryl, and arylalkyl; and $R_1$, $R_2$, and $R_3$ respectively selected from the group consisting of hydrogen, cation, or alkyl.

4. The process for preparing a finely divided particulate inorganic reinforcing filler pigment for use in elastomers consisting essentially of kaolin clay surface modified with mercaptoorganosilane comprising: preparing a dispersed aqueous kaolin clay slurry; adding to said slurry from 0.1 to 3.0% based on the weight of the dry pigment, of a mercaptoorganosilane of the formula:

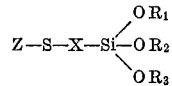

wherein Z is selected from the group consisting of hydrogen, cation, alkyl, aryl, alkylaryl, arylalkyl, acyl, and derivatives thereof; X is selected from the group consisting of alkyl, alkylaryl, and arylalkyl; and $R_1$, $R_2$, and $R_3$ are respectively selected from the group consisting of hydrogen, cation, or alkyl; and spray drying said slurry containing said mercaptoorganosilane at an inlet temperature not in excess of 800° F. to produce an odor free mercaptosilane surface modified kaolin clay for use in elastomers.

5. A method for reinforcing elastomers comprising the steps of modifying the surface of kaolin clay with from 0.1 to 3.0%, based on the weight of the dry clay, of a mercaptoorganosilane of the formula:

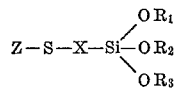

wherein Z is selected from the group consisting of hydrogen, cation, alkyl, aryl, alkylaryl, arylalkyl and derivatives thereof; X is selected from the group consisting of alkyl, alkylaryl, and arylalkyl; and $R_1$, $R_2$, and $R_3$ are selected from the group consisting of hydrogen, cation and alkyl; and combining the thus surface modified kaolin clay with an elastomeric material.

References Cited
UNITED STATES PATENTS

| | | | |
|---|---|---|---|
| 3,227,675 | 1/1966 | Papalos | 260—41 |
| 3,290,165 | 12/1966 | Iannicelli | 106—308 |
| 3,364,059 | 1/1968 | Marzocchi | 117—72 |
| 3,372,043 | 3/1968 | Fanselow | 107—72 |
| 3,392,182 | 7/1968 | Koerner | 260—448.8 |

TOBIAS E. LEVOW, Primary Examiner

J. V. HOWARD, Assistant Examiner

U.S. Cl. X.R.

106—288Q, 308Q; 260—766